United States Patent
Hutchison et al.

(10) Patent No.: US 8,131,877 B2
(45) Date of Patent: *Mar. 6, 2012

(54) METHOD FOR FLEXIBLE MODIFICATIONS TO A PACKET

(75) Inventors: Guy T. Hutchison, Santa Clara, CA (US); Awais B. Nemat, San Jose, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,572

(22) Filed: Oct. 4, 2010

(65) Prior Publication Data

US 2011/0022732 A1 Jan. 27, 2011

Related U.S. Application Data

(63) Continuation of application No. 11/962,828, filed on Dec. 21, 2007, now Pat. No. 7,822,875.

(60) Provisional application No. 60/871,339, filed on Dec. 22, 2006.

(51) Int. Cl.
*G06F 15/16* (2006.01)

(52) U.S. Cl. ........ 709/246; 709/212; 709/238; 709/249; 709/250

(58) Field of Classification Search .................. 370/392, 370/412, 428; 709/212, 246, 238, 249–250
See application file for complete search history.

(56) References Cited

U.S. PATENT DOCUMENTS

| | | | |
|---|---|---|---|
| 6,157,641 A | 12/2000 | Wilford | |
| 6,731,644 B1 | 5/2004 | Epps et al. | |
| 6,904,057 B2 | 6/2005 | Sarkinen et al. | |
| 7,133,931 B1 | 11/2006 | Allison et al. | |
| 7,218,647 B2 | 5/2007 | Ozguner | |
| 7,333,489 B1 | 2/2008 | Nelson et al. | |
| 7,362,753 B2 | 4/2008 | Irish et al. | |
| 7,688,727 B1 | 3/2010 | Ferguson et al. | |
| 7,701,941 B2 | 4/2010 | O'Callaghan et al. | |
| 7,702,882 B2 | 4/2010 | Wybenga et al. | |
| 7,822,032 B1 * | 10/2010 | Parker et al. | 370/392 |
| 7,822,875 B1 * | 10/2010 | Hutchison et al. | 709/246 |
| 2003/0043823 A1 | 3/2003 | Klotsche | |
| 2004/0001484 A1 | 1/2004 | Ozguner | |
| 2004/0001486 A1 | 1/2004 | Ozguner | |
| 2004/0003110 A1 | 1/2004 | Ozguner | |
| 2004/0019702 A1 | 1/2004 | Kojima et al. | |
| 2004/0156368 A1 | 8/2004 | Barri et al. | |
| 2004/0252693 A1 | 12/2004 | Cheriton et al. | |
| 2004/0258057 A1 | 12/2004 | Irish et al. | |
| 2006/0187947 A1 | 8/2006 | Ng | |

* cited by examiner

*Primary Examiner* — Oanh Duong

(57) ABSTRACT

A method allowing for flexible modification of a data packet in a data network is presented. A data packet is parsed based on one or more attributes and sent to a buffer memory and a user modifiable lookup table. Using extracted packet data, information required to modify the data packet as desired is located in the lookup table and forwarded to a packet modification engine. Within the packet modification engine, a novel rewrite constructor module generates unique packet rewrite information based on the information forwarded from the lookup table and one or more additional inputs. This unique packet rewrite information is forwarded to a packet rewrite engine, wherein the packet rewrite engine modifies the data packet accordingly.

17 Claims, 7 Drawing Sheets

METHOD FOR FLEXIBLE MODIFICATIONS TO A PACKET

RELATED APPLICATIONS

This application is a continuation of U.S. application Ser. No. 11/962,828, filed Dec. 21, 2007, now U.S. Pat. No. 7,822,875 titled METHOD FOR FLEXIBLE MODIFICATIONS TO A PACKET, which claims the benefit of priority to U.S. Provisional Application No. 60/871,339 filed Dec. 22, 2006, titled METHOD FOR FLEXIBLE MODIFICATIONS TO A PACKET, each of which is herein incorporated by reference in their entirety.

FIELD

The present disclosure relates generally to data networks and, more particularly, to a flexible method for modifying data packets within data networks.

BACKGROUND

Modern data networks typically comprise a plurality of network devices, including network bridges, switches, and routers. Such devices often perform many modifications to data packets in the course of normal operations. Desired modifications to data packets may include, for example, adding data to a packet (e.g., adding an Ethertype tag), removing data from a packet, changing data in a packet (e.g., modification of the MAC DA and SA), or prepending data to the packet (e.g., adding a header).

Network devices commonly implement packet modification capabilities through use of large memory buffers having the ability to temporarily store an entire data packet. In such devices, a data packet requiring modification is first stored in its entirety in a large memory buffer. Necessary changes to the data packet are then made within the memory buffer and, upon completion of all changes, the modified data packet proceeds from the memory buffer into the communication channel. While straightforward, this packet modification architecture results in substantial hardware costs associated with large memory buffers, as well as inherent system latencies caused by the need to buffer the entire packet during packet modification. Therefore, a flexible method for modifying a data packet without the need to buffer an entire packet during modification (i.e., near wire-speed modification) proves advantageous to efficient network device design.

Packet modification capabilities are often incorporated directly into network device hardware due to the operating speed benefits such a design offers. Present day network devices thus require either changing application-specific integrated circuits (i.e., ASICs) or redirecting data packets to higher-level software in order to modify data packets in a manner not anticipated in their original design. These changes can impact overall device performance and add significant network device latencies. Consequently, as new data network features are defined requiring the modification of packets in a manner not anticipated in a device's original design, it is desirable to develop a method for data packet modification allowing for implementation of new network features without requiring physical hardware changes or impacting overall device performance.

It is accordingly a primary object of the invention to allow for flexible near wire-speed modification of data packets within a data network after an original device design has been implemented, without the need for hardware changes or the redirection of packets to higher-level software to achieve packet modification.

SUMMARY

In accordance with at least one embodiment of the invention, a method for modifying a data packet on a data network is presented. Specifically, the method utilizes a novel rewrite constructor module having the capability of sending user programmable packet modification instructions to a wire-speed packet rewrite engine. In some embodiments, the method may be implemented using a combination of hardware and software. The packet modification method presented parses a data packet requiring modification and extracts desired information from the data packet based on one or more packet attributes (e.g., packet data structures) in a data packet parser. In some embodiments, desired information includes information obtained from one or more headers contained within the data packet. This information may include, for example, Ethernet address or type values, IPv4/IPv6 addresses, VLAN values from one or more VLAN tags, TCP port information, and/or UDP port information. Parsed data packet information is forwarded to a memory buffer and a memory containing a user modifiable lookup table. The user modifiable lookup table contains information useful in packet modification, including user programmable constants, index values for locating packet rewrite instruction templates and packet rewrite data templates stored in a memory, and pointer variables referencing user programmable memory locations. Information contained in the lookup table corresponding to the parsed packet information is selected and forwarded to a packet modification engine ("PME"). Packet data is also forwarded to the PME by the memory buffer, accounting for any latencies caused by the lookup table.

In at least one embodiment of the invention, the PME includes a rewrite constructor module configured to generate packet rewrite information readable by a wire-speed packet rewrite engine based on information forwarded from the lookup table, the packet parser, and additional user modifiable inputs. Additional user modifiable inputs may provide, for example, information including pointer variables for use in referencing user programmable memory locations and constant values useful in the modification of data packets (e.g., Ethertype constants, MACsec information). A packet rewrite engine ("PRE") capable of wire-speed packet modification is also included within the PME. The PRE takes the packet modification information generated by the packet rewrite constructor module, and modifies the data packet received from the memory buffer according to the generated packet modification information, generating a modified data packet.

At least one embodiment of the present invention may be implemented within a rewrite constructor module in multiple ways. For example, the rewrite constructor module may include two memory storage elements: one containing data packet modification instruction templates and another containing packet data templates (i.e., a Harvard Architecture). Using the information forwarded to the PME by the lookup table, the location of a packet rewrite instruction template within a memory storage is determined. The corresponding packet rewrite instruction template is then forwarded to an instruction parser, wherein discrete packet rewrite instructions capable of being utilized by the PRE are extracted. The selected lookup table information is forwarded to the memory storing packet data templates, wherein a packet data template is selected using index locations contained in the selected lookup table information. Using this packet data template as well as additional constant information, parsed packet information, and the selected lookup table information, discrete packet rewrite data is generated using a multiplexer. Packet rewrite information comprising the generated packet rewrite instructions and packet rewrite data is forwarded to the PRE for use in modifying the original data packet.

In at least one embodiment, the rewrite constructor may include a single storage element containing packet rewrite program templates containing both rewrite instructions and rewrite data (i.e., a VonNeumann Architecture). Using the selected information forwarded to the PME by the lookup table, the location of a packet rewrite program template within the memory storage is determined. The corresponding packet rewrite program template is forwarded to an instruction parser, wherein discrete packet rewrite instructions are extracted from the packet rewrite program template. A rewrite data vector containing information assembled from the parsed packet information, constant information, and selected lookup table information is then generated using a multiplexer and the extracted packet rewrite instructions. This rewrite data vector is then forwarded to an additional multiplexer, wherein the packet rewrite data, information contained in the extracted packet rewrite instructions, and the packet rewrite program template are assembled into a packet rewrite instruction stream. This rewrite instruction stream may be forwarded to the PRE for use in modifying the original data packet.

Methods and systems consistent with the present invention comprise means for parsing a data packet into data packet information based on one or more packet attributes; means for forwarding the parsed data packet information to a memory buffer and a user modifiable lookup table; means for selecting information contained in the user modifiable lookup table based on the parsed data packet information; means for assembling packet rewrite information based on the selected lookup table information, the parsed data packet information, and user programmable information; and means for modifying the data packet according to the packet rewrite information.

Additional objects and advantages of the invention will be set forth in part in the description which follows, and in part will be obvious from the description, or may be learned by practice of the invention. The objects and advantages of the invention may be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
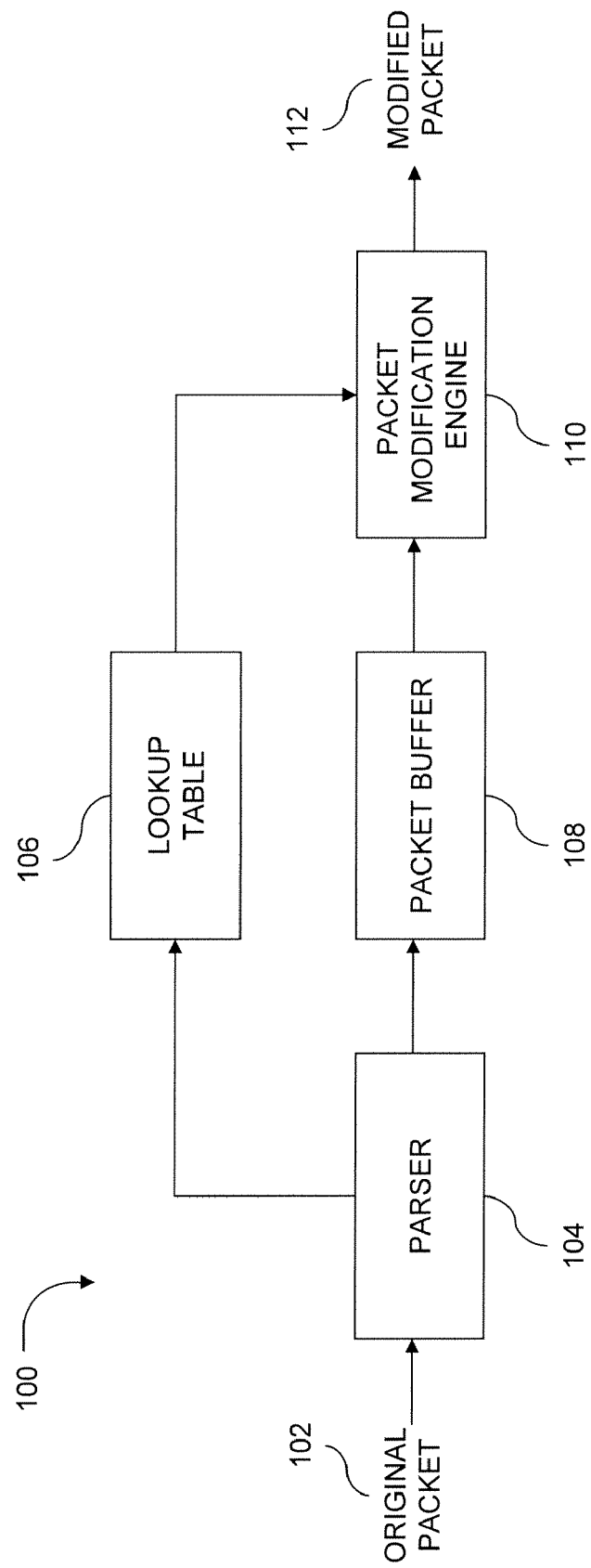
FIG. 1 is an illustration of a system 100 for modifying a data packet 102 on a data network in which at least one embodiment of the present invention may be implemented.

FIG. 1 is an illustration of a system 100 for modifying a data packet 102 on a data network in which at least one embodiment of the present invention may be implemented. The packet modification system 100 comprises a parser 104, a lookup table 106 located in a memory, a memory buffer 108 for buffering incoming packet data 102, and a packet modification engine 110 capable of making user specified modifications to the original data packet 102 and generating a modified data packet 112. In some embodiments, packet modification system 100 may be used to process a multiple bit data stream.

In the packet modification system 100 as illustrated, a data packet 102 enters a parser 104. Data parser 104 parses data packet 102 based on one or more defined packet attributes (e.g., packet header information, packet data structures) which may, for example, be determined by user or system requirements. Data parser 104 sends extracted packet data information to lookup table 106 and the original packet contents to memory buffer 108. Information contained in the parsed packet data is used within the lookup table 106 to select index memory locations containing information used to make packet modifications in a packet modification engine 110. Packet modifications to data packets may include, for example, adding data to a packet (e.g., adding an Ethertype tag), removing data from a packet, changing data in a packet (e.g., modification of the MAC DA and SA), or prepending data to the packet (e.g., adding a header), and may, for example, be determined by user or system requirements. The selected lookup table 106 information and the packet data buffered within the memory buffer 108 are sent to the packet modification engine 110. The packet modification engine 110 uses the information sent from the lookup table 106 and the memory buffer 108 to modify the original data packet 102 and generate a modified data packet 112.

Figure 2:
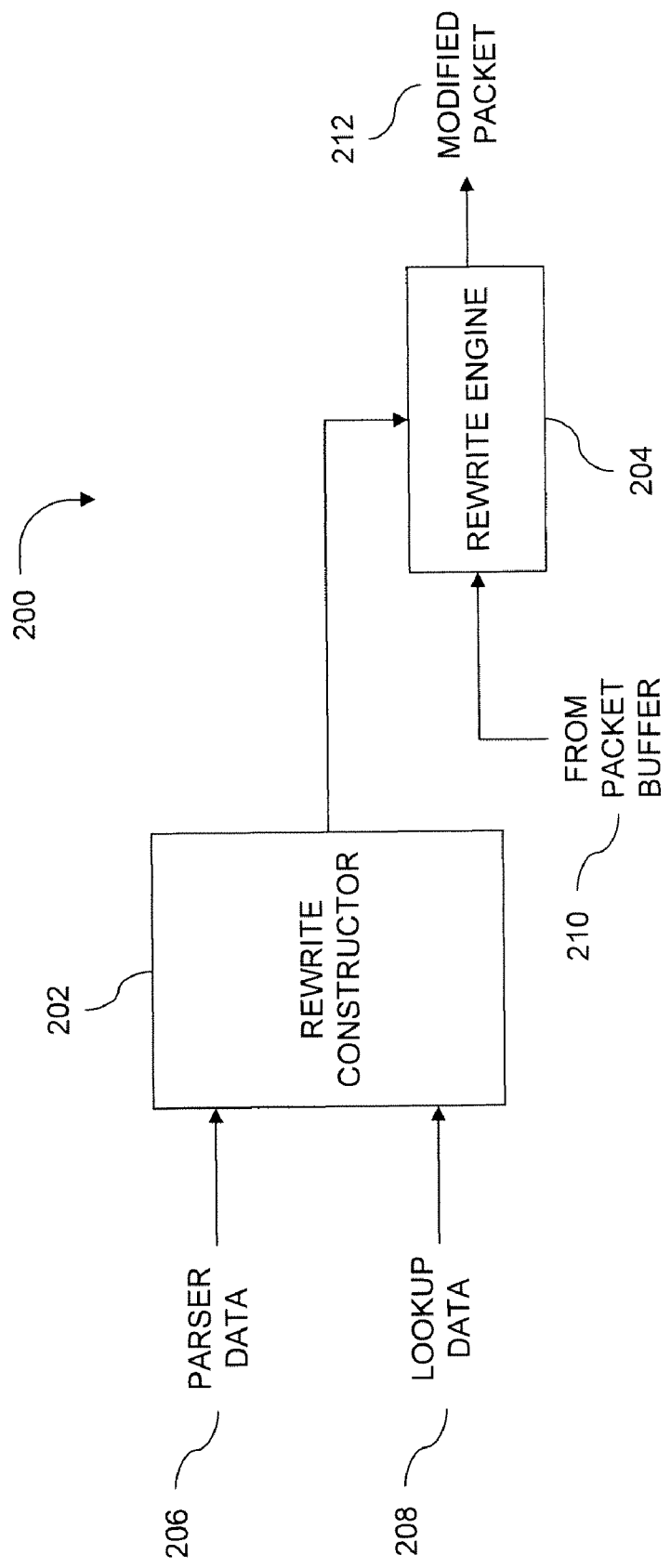
FIG. 2 is a block diagram illustrating a packet modification engine implementing at least one embodiment the present invention.

FIG. 2 is an illustration of a packet modification engine 200 implementing at least one embodiment of the present invention. The packet modification engine 200 as illustrated, comprises a rewrite constructor module 202 and a packet rewrite engine 204. The rewrite constructor module 202 utilizes one or more data inputs 206-208, including information received from a parser 206 extracting information from the original data packet 102 and information received from a lookup table 208, to assemble packet rewrite instructions capable of being utilized by a packet rewrite engine 204 to modify a data packet. Rewrite constructor module 202 may include an instruction template storage memory 306 that stores templates that determine the sequence of instructions which will be sent to the rewrite engine 204. These templates may contain, for example, a sequence of operation codes and parameters. In some embodiments, the process of generating a rewrite instruction from a stored instruction template involves substituting template values for instruction parameters with values given by the rewrite data vector 326. Packet rewrite engine 204 receives the packet rewrite instructions from the rewrite constructor module 202 and packet data from the memory buffer 210 and generates a data packet 212 modified according to the packet rewrite instructions.

Figure 3:
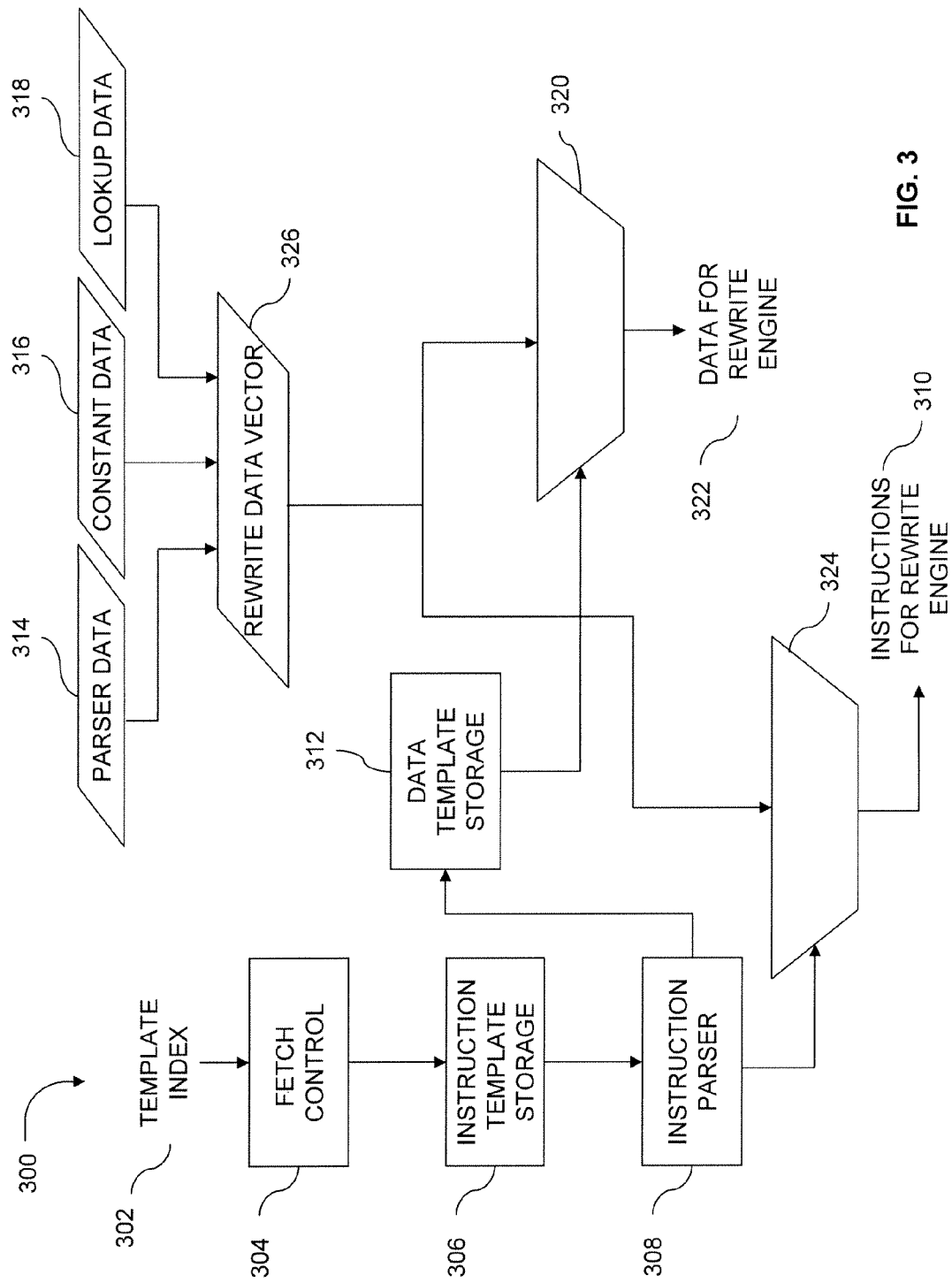
FIG. 3 is an illustration of a packet rewrite constructor module capable of generating packet rewrite information for use by a packet rewrite engine in modifying a packet, implementing at least one embodiment of the present invention.

FIG. 3 is an illustration of a Harvard Architecture packet rewrite constructor module 300 configured to generate packet rewrite information 310, 322 for use by a packet rewrite engine 204 in modifying a data packet 102, implementing at least one embodiment of the present invention. As illustrated, the packet rewrite constructor module 300 includes a fetch control module 304, a memory storing packet rewrite instruction templates 306, an instruction parser 308, a memory storing packet rewrite data templates 312, a multiplexer 320 capable of assembling packet rewrite data 322 from data vector 326 comprised of data provided by one or more inputs 314-318, and a multiplexer 324 capable of assembling rewrite engine instructions 310.

The packet rewrite constructor module 300 receives index information 302 containing index locations of data rewrite template instructions and rewrite data templates stored in memory 306, 312 from the lookup table 106. Template index information 302 is forwarded to a fetch control module 304, which retrieves a packet rewrite instruction template from the packet rewrite instruction template storage 306 based on the template index information 302. Fetch control module 304 may also use information provided by the instruction parser 308 in retrieving a packet rewrite instruction template from instruction template storage 306.

Multiplexer 324 assembles rewrite engine instructions 310 based on rewrite data vector 326 and instruction template information provided by the instruction parser 308. The rewrite data vector 326 may comprise, for example, data constants 316, information received from a parser 314 that extracts information from the original data packet 102, and information received from a lookup table 318. A rewrite data template is retrieved from data template storage 312 based on data template index information provided by the instruction parser 308 and forwarded to data multiplexer 320. Multiplexer 320 generates rewrite data information 322 based on the received rewrite data template and a rewrite data vector 326 which may comprise, as illustrated, data constants 316, information received from a parser 314 extracting information from the original data packet 102, and information received from a lookup table 318. Once the rewrite data information 322 is assembled, it is forwarded to a packet rewrite engine 204 for use in modifying a packet.

Figure 4:
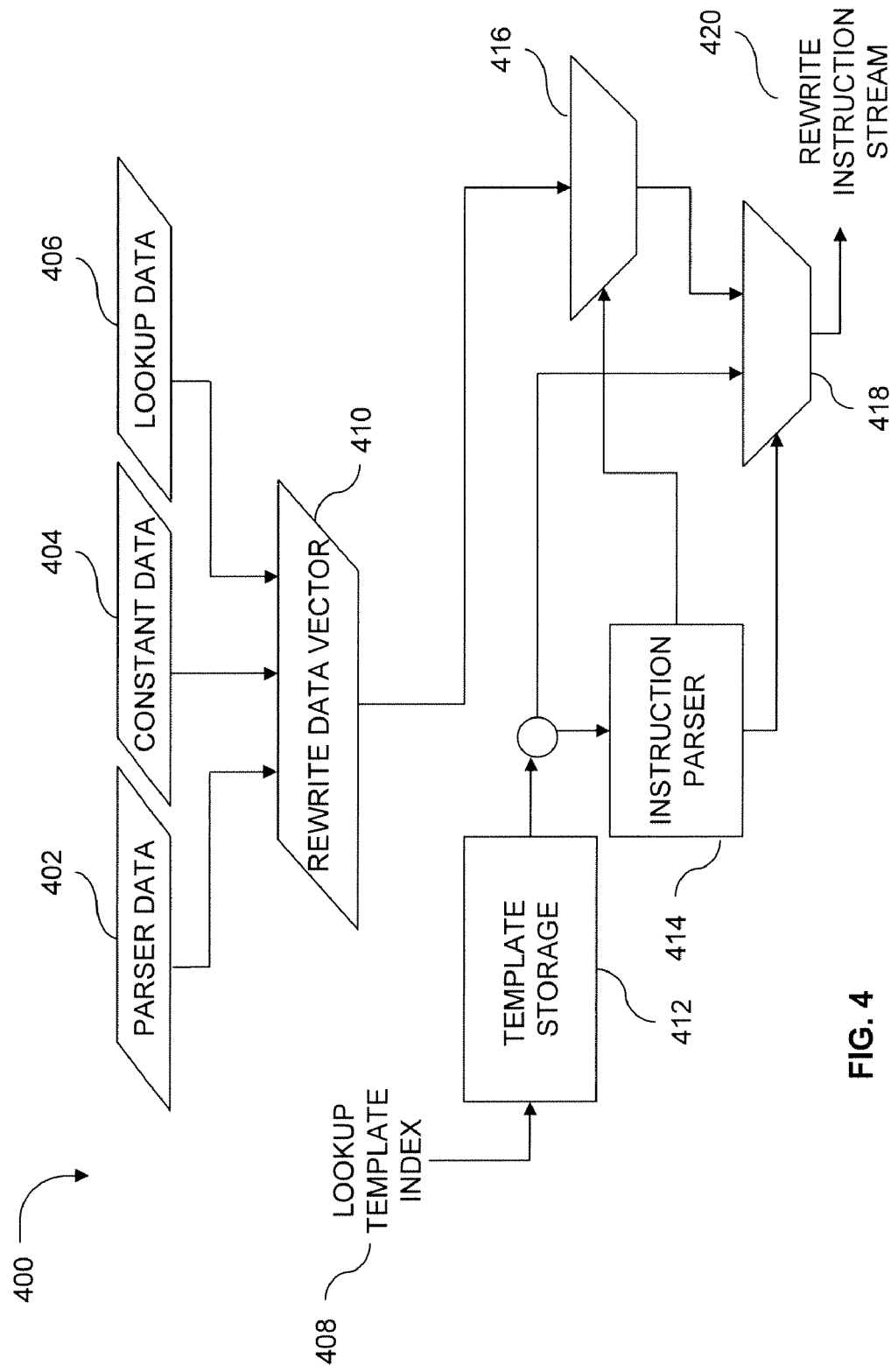
FIG. 4 is an illustration of a packet rewrite constructor module capable of generating packet rewrite information for use by a packet rewrite engine in modifying a packet, implementing at least one embodiment of the present invention.

FIG. 4 is an illustration of a VonNeumann architecture packet rewrite constructor module 400 configured to generate packet rewrite information 420 for use by a packet rewrite engine 204 in modifying a packet, in accordance with at least one embodiment of the present invention. As illustrated, the packet rewrite constructor module 400 includes a memory storing packet rewrite program templates 412, an instruction parser 414 capable of parsing data packet rewrite instructions from the packet rewrite program templates, one or more inputs 402-406 for use in assembling a packet rewrite data vector 410, a multiplexer 416 capable of assembling the user input information into a packet rewrite data vector 410, and a multiplexer 418 capable of assembling packet rewrite information from the packet rewrite data vector 410 and the packet rewrite instructions.

The packet rewrite constructor module 400 in FIG. 4, receives index information 408 containing an index location of a rewrite program template located stored in a memory 412 from the lookup table 106. This index information 408 is forwarded to a memory storing packet rewrite program templates 412. A rewrite program template is selected based on the index information 408, which is forwarded to an instruction parser 414. The instruction parser 414 parses template information containing interleaved rewrite instructions and data from the information provided by template storage 412, forwarding the template information containing interleaved rewrite instructions and data to a first multiplexer 416. First multiplexer 416 substitutes values in the received template information with values contained in the assembled rewrite data vector 410 based on information contained in the received template. Rewrite data vector 410 may comprise, as illustrated, data constants 404, information received from a parser 402 that extracts information from the original data packet 102, and information received from a lookup table 406. A second multiplexer 418 selects between values contained in the retrieved template and the substituted data provided by multiplexer 416 to generate a rewrite instruction/data stream 420. The resulting rewrite instruction/data stream 420 may be used by a packet rewrite engine 204 in modifying a data packet.

Figure 5:
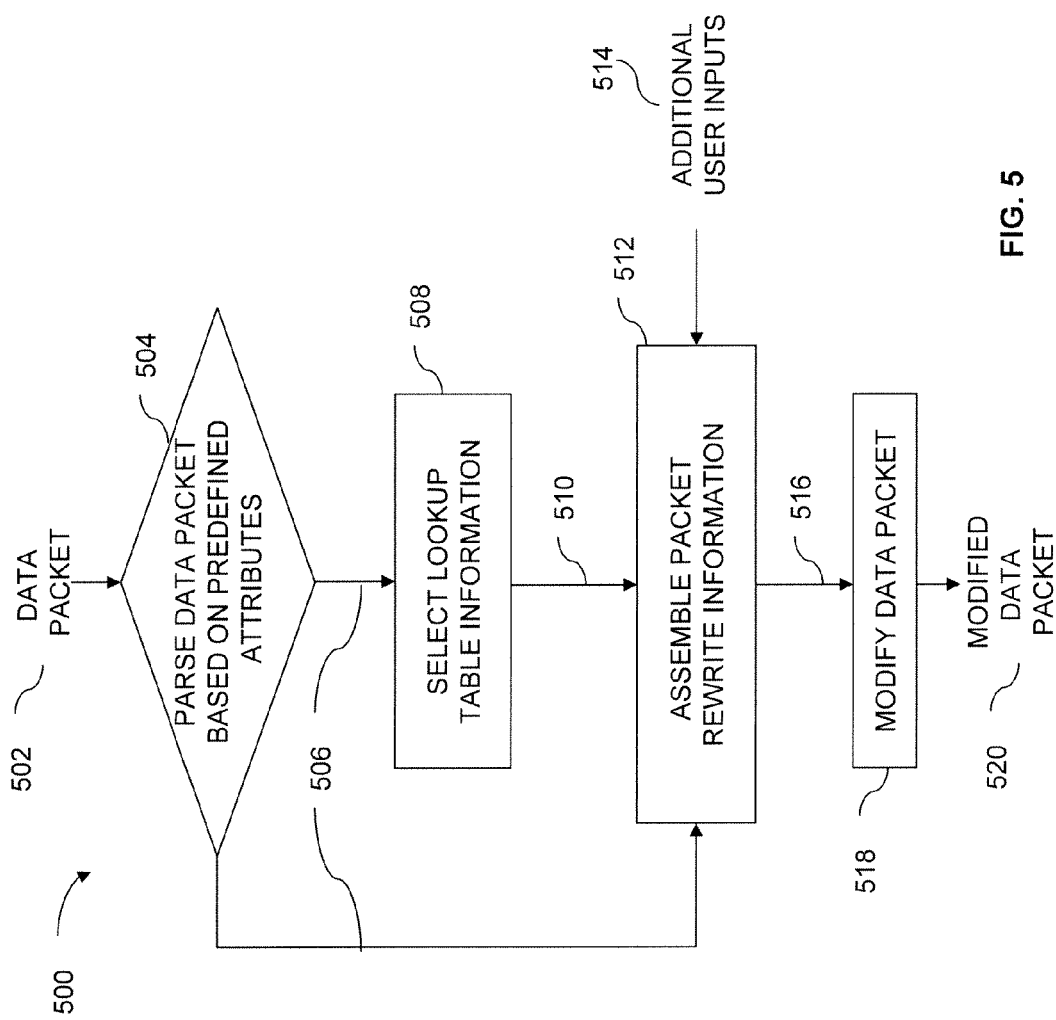
FIG. 5 is a flow chart illustrating processes within a system 100 implementing at least one embodiment of the present invention.

FIG. 5 is a flow chart 500 illustrating processes within a system 100 implementing at least one embodiment of the present invention. A data packet 502 is parsed 504 according to one or more predefined packet attributes (e.g., packet header information, packet data structures) which may, for example, be determined by user or system requirements. Information is selected 508 from a user modifiable lookup table based on the parsed data packet information 506. Information contained in the user modifiable lookup table may include, for example, user programmable constants, index values for locating packet rewrite instruction or data templates in a memory, and pointer variables referencing user programmable memory locations. Packet rewrite information is assembled 512 based on the parsed data packet information 506, the selected lookup table information 510, and one or more additional user inputs 514. Additional user inputs 514 may include, for example, programmable constant values (e.g., MACsec and/or other Ethertype constants) and data to be included in the modified packet. The data packet 502 is modified 518 according to the assembled packet rewrite information 516, generating a modified data packet 520.

Figure 6:
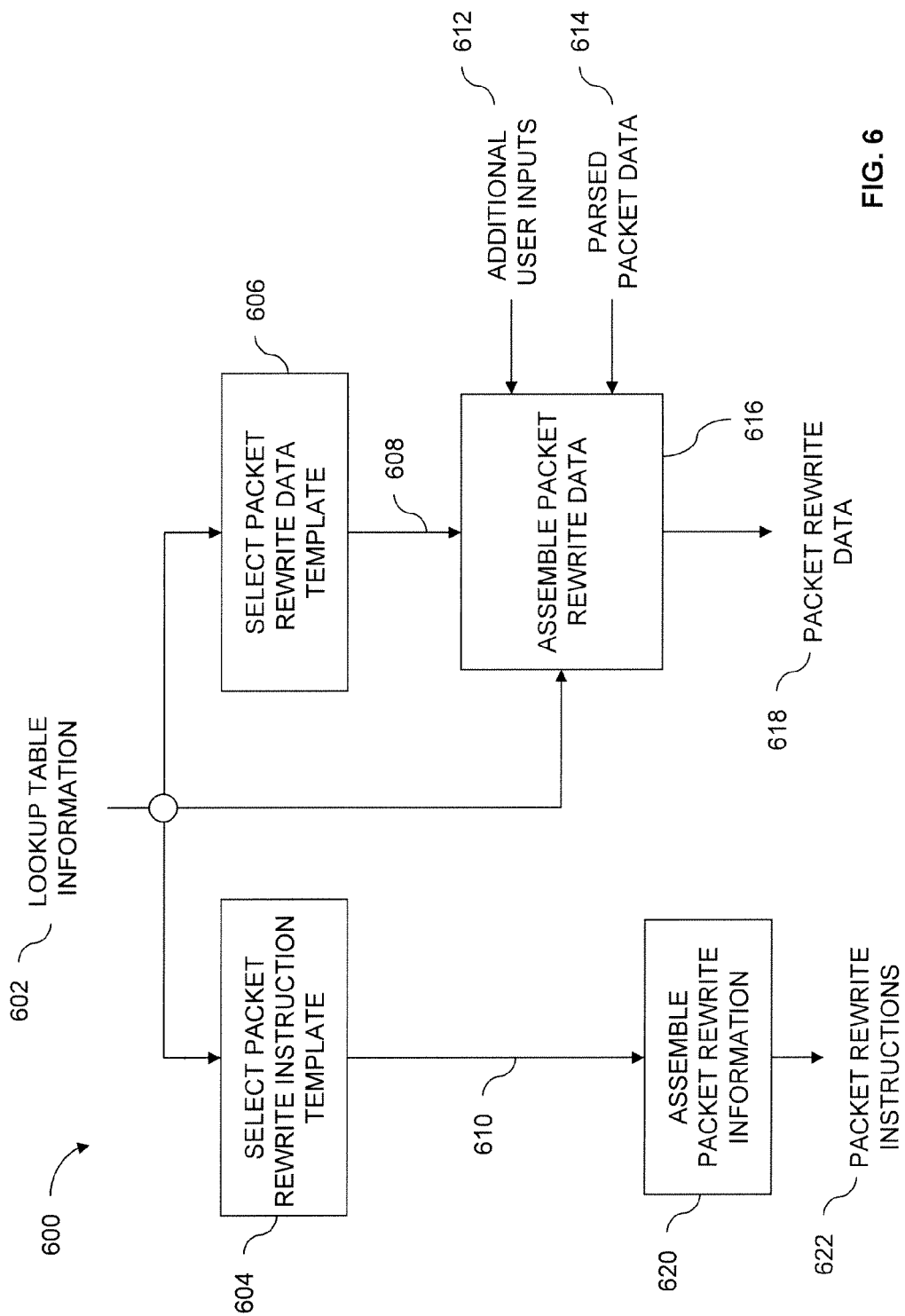
FIG. 6 is a flow chart illustrating processes within a rewrite constructor module 202 implementing at least one embodiment of the present invention.

FIG. 6 is a flow chart 600 illustrating processes within a Harvard Architecture rewrite constructor module 202 implementing at least one embodiment of the present invention. A packet rewrite instruction template 610 and a packet rewrite data template 608 are selected 604, 606 based on index information contained in the selected user modifiable lookup table information 602. Packet rewrite instruction templates may include, for example, instruction template information corresponding to inserting data, removing data, and overwriting data in a packet. Packet rewrite data 618 is assembled 616 based on the selected lookup table information 602, the packet rewrite data template 608, additional user inputs 612, and the parsed packet data 614. Additional user inputs 612 may include, for example, programmable constant values (e.g., MACsec and/or other Ethertype constants) and data to be included in the modified packet. Packet rewrite instructions 622 are assembled 620 based on the selected packet rewrite instruction template 610. Packet rewrite data 618 and instructions 622 may be referred to generally as packet rewrite information. Once assembled, packet rewrite data 618 and instructions 622 may be forwarded to a PME.

Figure 7:
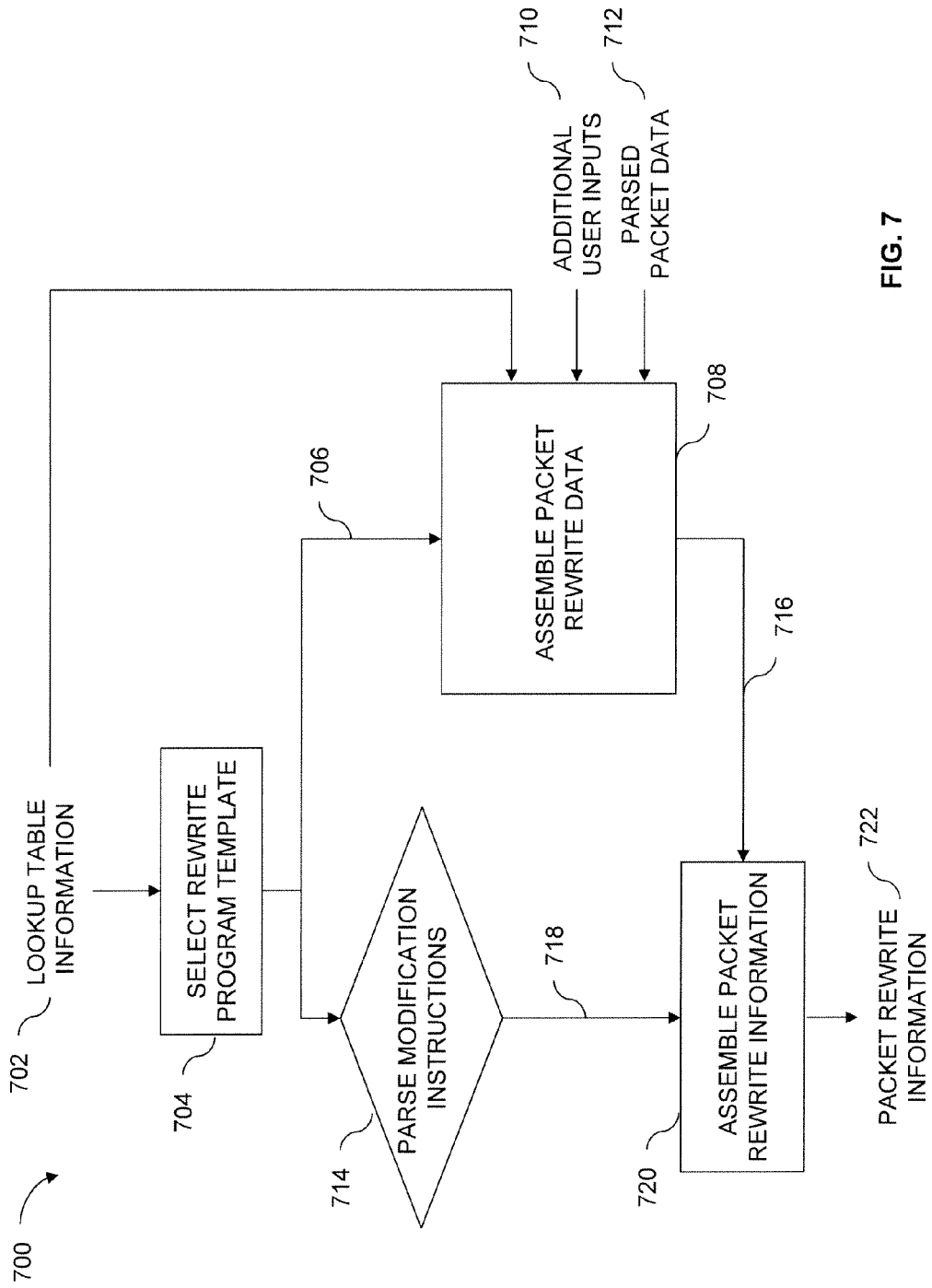
FIG. 7 is a flow chart illustrating processes within a rewrite constructor module 202 implementing another embodiment of the present invention.

FIG. 7 is a flow chart 700 illustrating processes within a VonNeumann Architecture rewrite constructor module 202 implementing another embodiment of the present invention. A packet rewrite program template 706 is selected 704 based on index information contained in the selected user modifiable lookup table information 702. Packet rewrite data is assembled 708 based on the selected program template 706, the selected lookup table information 702, additional user inputs 710, and the parsed packet data 712. Additional user inputs 710 may include, for example, programmable constant values (e.g., MACsec and/or other Ethertype constants) and data to be included in the modified packet. Packet modification instructions 718 are parsed 714 from the selected rewrite program template 706. Packet modification instructions may include, for example, template instructions corresponding to inserting data, removing data, and overwriting data in a packet. Packet rewrite information 722 is assembled 720 based on the packet modification instructions 718 and the assembled packet rewrite data 716.

The systems and methods disclosed herein are not inherently related to any particular computer or other apparatus, and may be implemented by a suitable combination of hardware, software, and/or firmware. Software implementations may include one or more computer programs. A computer program is a set of instructions readable and executable by a processor and can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network. Software may also be implemented as a computer program product, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for modifying a data packet on a data network, the method comprising:
   receiving a data packet having one or more packet attributes;
   parsing the data packet based on the one or more packet attributes to obtain information regarding the data packet;
   retrieving user inputs from a memory, wherein the retrieved user inputs are associated with the one or more packet attributes;
   generating a rewrite data vector comprising the information parsed from the data packet, and the user inputs from the memory;
   receiving index information from a lookup table that corresponds to the one or more packet attributes;
   fetching a rewrite instruction template and a rewrite data template from storage using at least the index information;
   assembling packet rewrite instructions, with an instruction multiplexer, based on the rewrite data vector, the rewrite instruction template, and the rewrite data template, the packet rewrite instructions being a sequence of instructions to modify the data packet; and
   modifying the data packet according to the sequence of instructions as set forth by the packet rewrite instructions.

2. The method of claim 1, wherein assembling the packet rewrite instructions comprises using information retrieved from the lookup table.

3. The method of claim 2, wherein the index information contained in the lookup table includes index values for locating i) packet rewrite instruction templates and ii) packet rewrite data templates stored in a memory.

4. The method of claim 2, wherein the index information contained in the lookup table includes pointer variables referencing user programmable memory locations.

5. The method of claim 1, wherein the packet rewrite information includes pointer variables referencing user programmable memory locations.

6. The method of claim 1, wherein assembling the packet rewrite information comprises:
   selecting the rewrite instruction template located in a first memory based on the information regarding the data packet;
   selecting the rewrite data template located in a second memory based on information contained in a user input;
   assembling rewrite data based on i) the information contained in the user input and ii) the rewrite data template; and
   assembling the packet rewrite information using i) the rewrite data template and ii) the rewrite instruction template.

7. The method of claim 1, wherein assembling the packet rewrite information comprises:
   selecting a rewrite program template located in a memory based on the information regarding the data packet;
   parsing out data packet modification instruction information from the rewrite program template;
   assembling packet rewrite data based on the rewrite program template; and
   assembling packet rewrite information based on i) the packet rewrite data and ii) the data packet modification instruction information.

8. A system comprising:
   a memory that stores a rewrite data vector comprising information parsed from a data packet, and one or more user inputs delivering input information associated with the data packet;
   a rewrite constructor module in communication with the memory, the rewrite constructor module configured to assemble, using at least an instruction multiplexer, packet rewrite instructions based on the rewrite data vector, and based on a rewrite instruction template and a rewrite data template fetched from storage using at least index information, wherein the index information is retrieved from a lookup table that associates the index information to the data packet attributes, the packet rewrite instructions being a sequence of instructions to modify the data packet; and
   a rewrite engine in communication with i) the rewrite constructor module and ii) the memory that stores the rewrite data vector, the rewrite engine configured to modify a data packet according to the sequence of instructions as set forth in the packet rewrite instructions assembled by the rewrite constructor module.

9. The system of claim 8, wherein the input information includes the data packet to be modified.

10. The system of claim 8, wherein the input information includes constants to modify the data packets.

11. The system of claim 8, wherein the input information includes information provided by a user modifiable lookup table.

12. The system of claim 11, wherein the information contained in the user modifiable lookup table includes user programmable constants.

13. The system of claim 11, wherein the information contained in the user modifiable lookup table includes index values for locating i) packet rewrite instruction templates and ii) packet rewrite data templates stored in a memory.

14. The system of claim 11, wherein the information contained in the user modifiable lookup table includes pointer variables referencing user programmable memory locations.

15. The system of claim 8, wherein the packet rewrite instructions includes packet rewrite instructions from the rewrite instruction template and packet rewrite data from the rewrite data vector.

16. The system of claim 8, wherein the packet rewrite instructions includes pointer variables referencing user programmable memory locations.

17. The system of claim 8, wherein the rewrite constructor module further comprises:
- a first memory storing data packet modification template instructions in communication with the one or more user inputs;
- an instruction parser, in communication with the first memory storing data packet modification template instructions, configured to extract data packet rewrite instructions from the data packet modification template instructions for use in a the rewrite engine;
- a second memory storing packet data templates in communication with the instruction parser; and
- a multiplexer, in communication with the second memory storing packet data templates and the user inputs, configured to assemble packet rewrite data based on the data packet modification template instructions, the packet data template, and the one or more user inputs.

* * * * *